(12) United States Patent
Overturf (10) Patent No.: US 9,207,377 B2
(45) Date of Patent: Dec. 8, 2015

(54) ARTIFICIAL LIGHTING SYSTEM

(71) Applicant: Matthew Overturf, Greeneville, TN (US)

(72) Inventor: Matthew Overturf, Greeneville, TN (US)

(*) Notice: Subject to any disclaimer, the term of this patent is extended or adjusted under 35 U.S.C. 154(b) by 355 days.

(21) Appl. No.: 13/746,909

(22) Filed: Jan. 22, 2013

(65) Prior Publication Data

US 2013/0188389 A1    Jul. 25, 2013

Related U.S. Application Data

(60) Provisional application No. 61/588,678, filed on Jan. 20, 2012.

(51) Int. Cl.

| | |
|---|---|
| *G02B 6/00* | (2006.01) |
| *F21V 8/00* | (2006.01) |
| *F21V 13/02* | (2006.01) |
| *A01G 9/26* | (2006.01) |
| *A01G 7/04* | (2006.01) |
| *F21S 8/06* | (2006.01) |
| *F21V 23/04* | (2006.01) |
| *F21V 29/67* | (2015.01) |

(52) U.S. Cl.
CPC .............. *G02B 6/0008* (2013.01); *A01G 7/045* (2013.01); *A01G 9/26* (2013.01); *F21V 13/02* (2013.01); *F21S 8/061* (2013.01); *F21V 23/0442* (2013.01); *F21V 29/677* (2015.01); *G02B 6/0006* (2013.01)

(58) Field of Classification Search
CPC ... F21V 2008/00; F21V 29/025; G02B 6/008; G02B 6/0006; A01G 7/045
USPC ......... 362/583, 558, 563, 554, 805, 319, 293, 362/276
See application file for complete search history.

(56) References Cited

U.S. PATENT DOCUMENTS

| | | | | |
|---|---|---|---|---|
| 4,298,806 | A * | 11/1981 | Herold | 250/504 H |
| 4,428,029 | A * | 1/1984 | Baliozian | 362/12 |
| 4,626,065 | A * | 12/1986 | Mori | 385/25 |
| 5,791,756 | A * | 8/1998 | Hulse et al. | 362/554 |
| 6,144,482 | A * | 11/2000 | Young et al. | 359/305 |
| 6,195,016 | B1 * | 2/2001 | Shankle et al. | 340/815.42 |
| 6,231,503 | B1 * | 5/2001 | Sugimoto et al. | 600/178 |
| 7,738,192 | B1 * | 6/2010 | Tobey et al. | 359/802 |
| 2002/0136028 | A1 * | 9/2002 | Smith | 362/580 |
| 2003/0090909 | A1 * | 5/2003 | Kalkbrenner | 362/554 |
| 2011/0122366 | A1 * | 5/2011 | Smith | 351/221 |

* cited by examiner

*Primary Examiner* — Peggy Neils
(74) *Attorney, Agent, or Firm* — Luedeka Neely Group, P.C.

(57) ABSTRACT

An artificial lighting system. The artificial lighting system generates electromagnetic radiation at a source location, and outputs the electromagnetic radiation at a target location. The output is in the form of electromagnetic radiation in the visible spectrum and/or photosynthetically active radiation. In some embodiments, the electromagnetic radiation is focused and distributed through one or more lenses to provide increased intensity. For target locations that are physically remote from the source location, optical waveguides and components distribute the electromagnetic radiation. Some embodiments incorporate an automated emitter allowing the output of the artificial lighting system to be moved at the target location. The artificial lighting system seeks to provide high intensity electromagnetic radiation to the target while minimizing the exposure of the target to the heat generated by the light source.

20 Claims, 4 Drawing Sheets

ARTIFICIAL LIGHTING SYSTEM

BACKGROUND

Artificial lighting provides a valuable source of light for household and agricultural applications. Generally, the light emitted from a light source will lose intensity as it radiates from the source in various directions. The light emitted is dispersed in all directions and may be absorbed by the walls and ceiling of a room, further reducing the intensity of the light. Additionally, to provide light to a desired area, the light source generally must be in close proximity to the area to be lit. When a light source emits light, large amounts of heat may be produced because of the energy required by the light source and inefficiencies in converting the energy into light.

What is needed therefore is an efficient lighting system that provides the ability to direct focused light to a point remote from a light source and where the intensity of the light does not substantially decrease as the light travels from the source to the desired location. Further, excess heat buildup at the source should be minimized or precluded. It was with these problems in mind that the present invention was conceived.

BRIEF SUMMARY

The following Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

The present disclosure is directed to an artificial lighting system efficiently directing intense light to a desired location(s). In one embodiment, optical waveguides gather light from a source located remotely from the desired location for emitting the light, thereby reducing excess heat created by the light source while focusing intense light to where it is useful. The above and other needs are met, in one aspect, by an artificial lighting apparatus having a housing, a light source, and, in one embodiment, one or more lenses radially located 360° around the light source. Alternatively, a cylindrical apparatus containing lenses, or a 360° cylindrical lens could be motorized and made to rotate within the housing for increased focused light coverage. One or more optical waveguides are attached to the light source housing having a first end that could be directly adjacent to the one or more lenses of the light source housing and a second end located at a distal location from the light source housing. Optical waveguides partially or completely surround the light source or the rotating cylindrical apparatus for increased surface area of the optical waveguides. According to one embodiment, the light source is selected from the group consisting of a high intensity discharge bulb, a fluorescent light bulb and a halogen light bulb. Light is emitted from the light source and enters the one or more optical waveguides through the one or more lenses or directly without lenses. The light is then emitted from the second end of the one or more optical waveguides.

In alternate embodiments, the light is emitted through an open portion of the housing or one or more lenses. Alternatively, a 360° cylinder lens could focus light emitted around a lamp directly without optical waveguides, and may be motorized to allow it to rotate. This type of lens could alternatively be made into light bulbs that focus light and may pivot or rotate at their socket or connectors with a motorized adapter(s). Suspended LEDs or lasers could be directed closer to the desired object, providing brighter light more evenly and from different angles without the use of optical waveguides. Alternatively, LEDs or lasers could illuminate optical waveguides.

The artificial lighting system may also include a cooling system having a fan device and an exhaust and/or intake vent, or connections for air ducting. The cooling system reduces the temperature of the light source by moving air through the housing and venting the heated exhaust air.

BRIEF DESCRIPTION OF THE DRAWINGS

Further features, aspects, and advantages of the invention represented by the embodiments described and claimed in the present disclosure will become better understood by reference to the accompanying figures, wherein the pictured elements are not necessarily to scale, wherein some elements are exaggerated or omitted to more clearly show details, wherein like reference numbers indicate like elements throughout the several views, and wherein:

DETAILED DESCRIPTION

An artificial lighting system is described herein and illustrated in the accompanying figures. The artificial lighting system generates electromagnetic radiation at a source location, and outputs the electromagnetic radiation at a target location. The output is in the form of electromagnetic radiation in the visible spectrum and/or photosynthetically active radiation. In some embodiments, the electromagnetic radiation is focused and distributed through one or more lenses to provide increased intensity. For target locations that are physically remote from the source location, optical waveguides and components distribute the electromagnetic radiation. Some embodiments incorporate an automated emitter allowing the output of the artificial lighting system to be moved at the target location. The artificial lighting system seeks to provide high intensity electromagnetic radiation to the target while minimizing the exposure of the target to the heat generated by the light source.

To provide consistency and clarity in this application, the terms "emissions" and "light" are used only to distinguish between electromagnetic radiation inside and outside the artificial lighting system. "Emissions" generally refers to electromagnetic radiation while inside the artificial lighting system such as the output of the light source and electromagnetic radiation travelling though the optical waveguides and other components. "Light" generally refers to the final output of the artificial lighting system directed at a target area. Neither term is intended to impose any specific characteristic (e.g., wavelength, etc.) on the electromagnetic radiation to which it refers.

Figure 1:
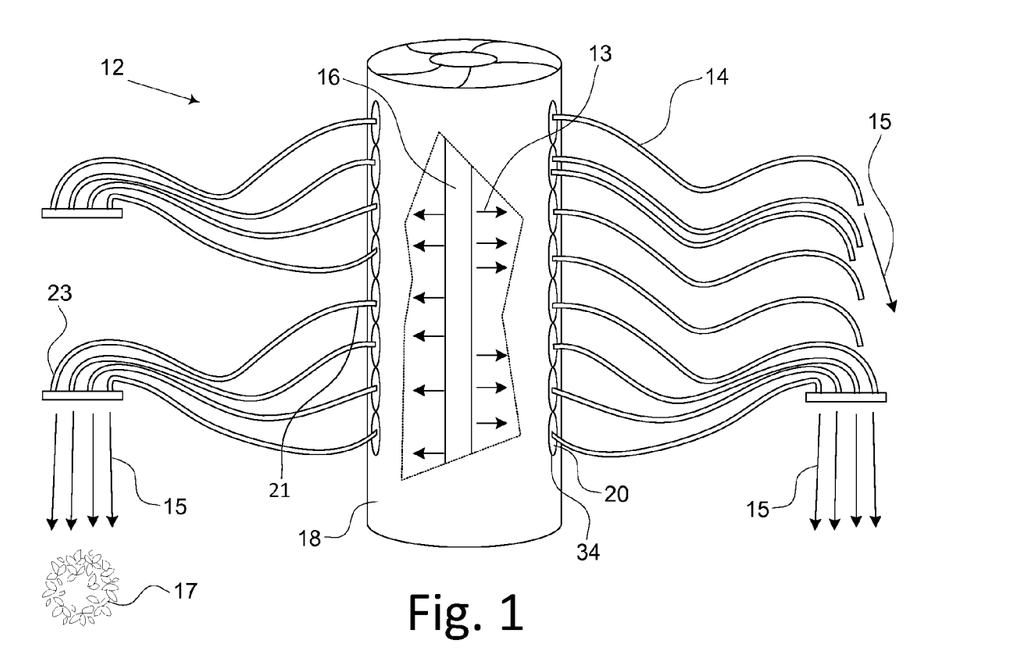
FIG. 1 is a side view of one embodiment of the artificial lighting system with a cutout to expose the light source.

FIG. 1 illustrates one embodiment of an artificial lighting system 12 including a housing 18, a light source 16, and one or more optical waveguides 14. Electromagnetic radiation (i.e., emissions) is emitted from the light source 16. At least some of the emissions 13 are carried to a location remote from the light source 16 via the optical waveguides 14. The emissions 13 enter the first ends 21 of the optical waveguides, which are located proximate to the light source. Light 15 is directed at a target 17 from the distal ends 23 of the optical waveguides, which are located at the location remote from the light source. The target 17 may be a room or other area or a specific object such as a plant or painting. Although not illustrated, those skilled in the art will recognize that the light source includes any starters, ballasts, transformer cores, capacitors, or other components necessary for proper operation. Such components may be internal or external to the housing of the artificial lighting system 12.

Figure 2:
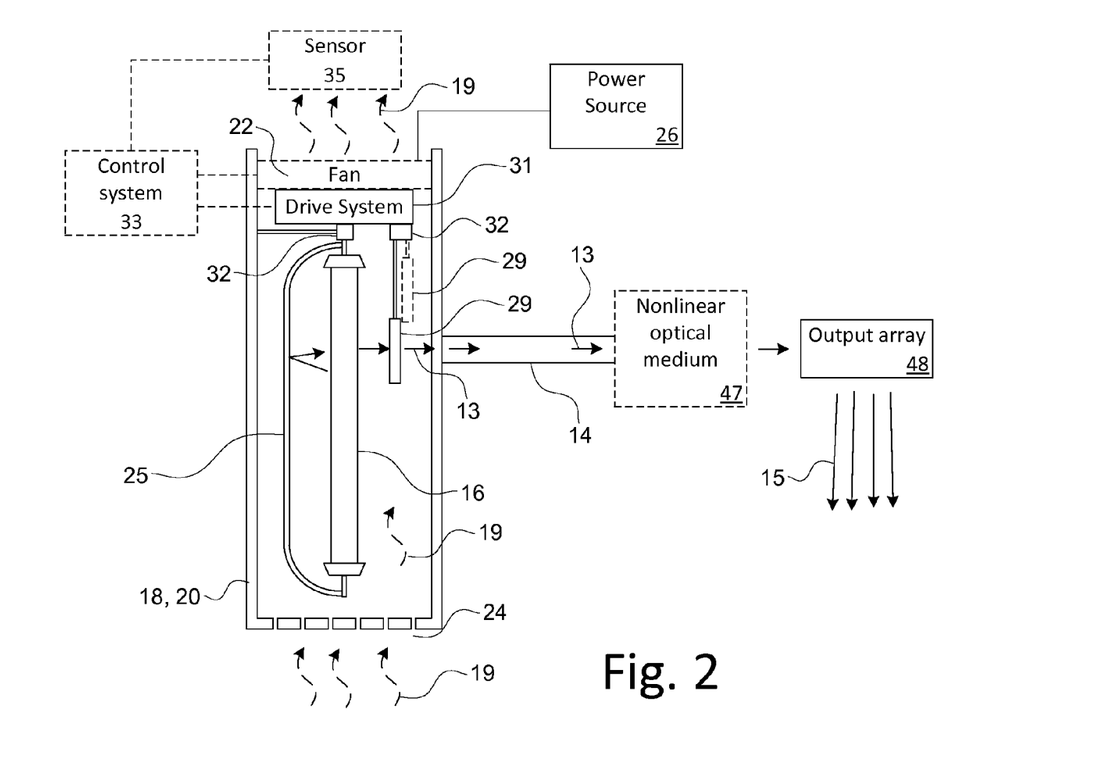
FIG. 2 is a schematic diagram of an alternate embodiment of an artificial lighting system including various optional components.

FIG. 2 illustrates an alternate embodiment of an artificial lighting system 12 including various optional components. The housing 18 substantially encloses the light source 16. The housing 18 may be cylindrical in shape, however, it is also understood that the housing 18 may also be square, rectangular, oval, or other suitable shapes. Examples of suitable materials used to fabricate the housing include metals and plastics. Some embodiments of the housing include a window allowing light to escape. Power is provided to the artificial lighting system light source 16 by a power source 26.

In various embodiments, an optically reflective coating is applied to some or all of the interior surface of the housing 18. The optically reflective coating reduces intensity losses due to absorption of the light by the housing 18. Examples of suitable optically reflective coatings include, but are not limited to, metallic foils, metallic films, metallic paints, metalized polymeric films, and flat white paints.

In various embodiments, the artificial lighting system employs high intensity light sources with sufficient output to provide the desired illuminance at remote target areas despite transmission losses. Examples of suitable light sources include, but are not limited to, high intensity discharge (e.g., mercury vapor, metal halide, sodium vapor, and xenon) lamps, fluorescent lamps, light emitting diodes (LEDs), and lasers. In some embodiments, plasma or induction light sources are used although such light sources are rare and less efficient than conventional high intensity discharge light sources. In some embodiments, the artificial lighting system is a hybrid system supplementing artificial light with natural sunlight directed into waveguides using light tubes, reflectors, or lenses. Examples of suitable lasers for use as the light source include, but are not limited to, free electron lasers, photonic crystal lasers, gas lasers, dye lasers, fiber lasers, fiber disk lasers, solid state lasers, solid state disk lasers, semiconductor lasers, and Raman lasers. The embodiment illustrated in FIG. 4 may act as a Raman laser if no anti-reflection design elements such as anti-reflective coatings or tilted window regions at the end faces are included. Some embodiments of the light source are partially surrounded by a reflector 25 to direct the emissions in a certain direction or within a certain range of angles from the source and may have a lens front. In some embodiments, the emissions from a laser or a waveguide are directed using galvanometer (galvo) mirrors.

The artificial lighting system may include multiple light sources to generate the desired output illuminance. Illuminance is generally expressed as lumens for human visible light and photosynthetic photon flux (PPF) for plants. Further, the artificial lighting system may include different types of light sources to generate the desired light spectrum or to provide instant on capability when the primary light source is slow to start (e.g., fluorescent lamps). For example, the artificial lighting system may include a light source containing a high pressure sodium light bulb, which produces a light primarily in the yellow to red spectrums, and a light source containing a metal halide bulb, which produces light primarily in the blue spectrum, to produce a broad spectrum. Providing such a broad spectrum of intense light to foliage maximizes photosynthetic response and chlorophyll production in plants.

In some embodiments, the multiple light sources are aggregated in the housing and the target area is simultaneously exposed to combined spectrum of all light sources. In other embodiments, multiple light sources are segregated (e.g., by dividers or reflectors) and the light sources are moved thereby selectively exposing the optical waveguides to the different emissions of each light source. In this manner, the target area is separately exposed to the spectrum produced by each separate light source of the artificial lighting system. In still other embodiments, the outputs of multiple artificial lighting systems are merged to produce the desired illuminance or a combined spectrum based on the light sources employed by each artificial lighting system.

With light sources using multiple lamps (e.g., lasers or LEDs), the lamps may be arranged into one or more tiers such that some of the lamps will be positioned behind the other lamps. For example, infrared lamps may be positioned behind blue and red light lamps. Arranging the lamps in tiers enables the lamps to occupy substantially less space. In some embodiments, the individual lamps in light sources using multiple lamps may be independently controlled. This allows some lamps to remain off when not needed (e.g., seedlings or plants requiring less light) or desired (e.g., dimmed or mood lighting) to reduce power consumption and heat buildup. Alternatively, different color or variable color light sources (e.g., RGB LEDs) may be used for decorative lighting purposes or to provide variable wavelength output.

A substantial portion of the light produced by the artificial lighting system has wavelengths in the range of approximately 380 nm to approximately 770 nm, referred to herein as the "output spectrum." For reference, the visible spectrum is generally defined as electromagnetic radiation having wavelengths between 390 nm to 750 nm. Photosynthetically active radiation is generally defined as electromagnetic radiation with wavelengths between 400 nm to 700 nm. In various embodiments, a substantial portion of the light produced by the artificial lighting system has wavelengths in the range of approximately 650 nm to approximately 670 nm. In some embodiments, a substantial portion of the light produced by the artificial lighting system has wavelengths of approximately 660 nm. In other embodiments, a substantial portion of the light produced by the artificial lighting system has wavelengths in the range of approximately 430 nm to approximately 450 nm. In some embodiments, a substantial portion of the light produced by the artificial lighting system has wavelengths of approximately 440 nm. In various embodiments, the spectrum produced by the light source falls within the output spectrum. In other embodiments, the spectrum produced by the light source is modified (e.g., filtered or frequency shifted) as discussed below to obtain the output spectrum.

The optical distribution subsystem distributes and/or conditions the emissions that are ultimately produced as light by the artificial lighting system. Various embodiments of the optical distribution subsystem include some or all of the following components: lenses, optical waveguides, filters, and nonlinear optical media.

In various embodiments, the artificial lighting system includes one or more lenses 20 disposed around the light source 16. The lenses serve to focus and/or shape the emissions from the light source. In the illustrated embodiment of FIG. 1, the artificial lighting system includes multiple lenses 20 located radially about the longitudinal axis of the light source 16 to capture substantially all of the emissions. The lenses 20 are positioned in through-openings 34 defined by the lens carrier. One suitable lens carrier is the housing 18. In various embodiments, the lenses are fixed in the openings using a permanent fastener. In other embodiments, the lenses are fixed in the openings using a non-permanent fastener allowing the lenses to be easily changed or replaced.

The lens carrier positions the lenses at selected distances from the light source 16. In various embodiments, the distance between the light source and the lens varies with the size of the light source 16. In some embodiments, the lens carrier is adjustable to vary the distance between the light source and the lens. Generally, it is desirable to locate the lenses closer to smaller light sources and further away from larger light sources. In various embodiments, the lens carrier is stationary and distributes the focused emissions in a fixed pattern. In other embodiments, the lens carrier moves to distribute the focused emissions through the target area. In some embodiments, the lens carrier only partially surrounds the light source causing some emissions to be focused, shaped, and/or directed by the lenses and allowing some emissions to escape the housing without interacting with the lenses.

Examples of suitable lenses include simple lenses, cylindrical lenses, spherical lenses, aspherical lenses, and Fresnel lenses. Cylindrical lenses generally focus the emissions into lines. Spherical lenses generally focus the emissions into points. In various embodiments, the focused emissions are directed at the optical waveguides. In other embodiments, the focused emissions are directly applied to the target. Some embodiments of the artificial lighting system employ multiple types of lenses or lenses with different surface profiles to focus the emissions into different shapes or different distances. In some embodiments, a light hood is used in conjunction with the lens to focus the emissions.

In some embodiments, such as that illustrated in FIG. 2, the housing 18 also serves a single lens structure that wraps substantially 360° around the light source 16. The single lens structure may be generally cylindrical or elliptical in shape, rather than having a surface profile being shaped like a section of a cylinder as in a conventional cylindrical lens. The single lens structure may be comprised of one or more lens faces spiraling in a helix or converging in straight lines for example. Halves of a 360° cylindrical lens structure may be used to provide adjustment for the output of the artificial lighting system. The single lens structure may focus light emitted from the light source 16 directly at a desired target area.

Ultraviolet and/or infrared filters or dopant may be included in the lens structure to reduce output of harmful light wavelengths, if they are not intended for use with nonlinear optical media 47 to change the output wavelength. The lens may be coated with a phosphor to alter the spectrum output somewhat (at the cost of some intensity). In some embodiments, the single lens structure is ventilated as described above in reference to the housing. The single lens structure may be contained inside the housing and used in place of the fixed lenses illustrated in FIG. 1 or a rotating apparatus containing lenses around some portion of the housing to distribute focused light into more optical waveguides variably. In some embodiments, the optical waveguides completely surround the single lens structure. Alternatively, the single lens structure lens may be partially coated or surrounded with a reflective material to control the output of the light within a certain range.

In various embodiments, the optical waveguides have a first end positioned proximate to the light source 16 and a second end positioned at a remote location relative to the light source. The first end of the optical waveguide may be attached to any suitable component including, but not limited to, the light source, the housing, or a lens. The optical waveguides carry the emissions to those remote locations with minimal losses. Examples of suitable optical waveguides include, but are not limited to, fiber optic cables, photonic fibers, and tubes filled with a fluid having a high refractive index. In some embodiments, the optical waveguide cladding or jacket serves to maintain the shape and/or position of the optical waveguide. Examples of suitable materials for fabricating fiber optic cables include, but are not limited to, a pure glass such as silica, a plastic such as acrylic or perfluorinated polymers, polyvinyl chloride (PVC), ceramics, polyurethanes, a polymer such as translucent silicon or latex, or a combination thereof. FIGS. 5, 6A, and 6B illustrate various embodiments of the optical waveguides with differing cross sectional shapes. Examples of other suitable cross-sectional shapes include rectangles, hexagons, and octogons.

Figure 3:
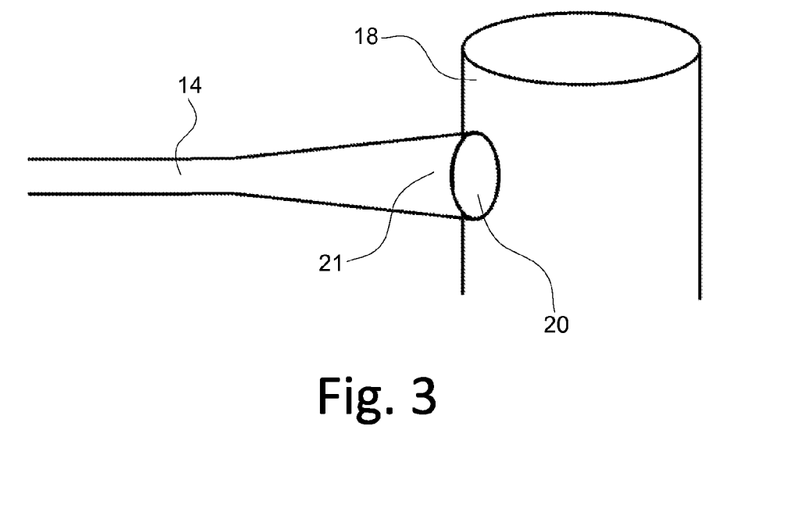
FIG. 3 illustrates a tapered end of an optical waveguide according to one embodiment of the present disclosure.

In some embodiments, such as that illustrated in FIG. 3, the first end of the optical waveguide 14 may be tapered such that a substantial portion of the emissions from the light source 16 is captured by the optical waveguides 14. In some embodiments, the emissions carried by one optical waveguide are directed into additional optical waveguides using optical splitters. In some embodiments, the second end of the waveguide includes a lens that focuses the light leaving the optical waveguide on a desired location. In some embodiments, a lens is integrated with one or both ends of the optical waveguide.

In some embodiments, the optical waveguides are designed to produce light along all or a portion of the length of the optical waveguide rather than at just one end. The cores of photonic fibers may be solid as with conventional optical fibers, or light may be confined by a photonic bandgap in the photonic fiber with a lower index or hollow (air) core. Alternatively, a side glow, rather than end glow, optical waveguides may be used. The second end of the side glow cable or the photonic fiber may be positioned proximate to the light source 16 to capture emissions at both ends and increase the illuminance. In another embodiment, phosphor coated or doped optical waveguides are used to emit light along the length of the optical waveguide. In some embodiments, the side glow optical waveguide or photonic fiber is partially coated with a reflective material to direct the light in a selected direction and increase illuminance.

The artificial lighting system optionally includes filters 29 to control or alter the emissions from the light source before being output as light. Examples of suitable filters include color filters or wheels for altering the wavelength, fully or partially opaque filters for dimming or blocking emissions, and wavelength specific filters (e.g., infrared or ultraviolet) for blocking selected wavelengths. In some embodiments, the filters substantially surround the light source. In other embodiments, the filters only partially surround the light source. In some embodiments, a filter carrier positioned proximate to the light source holds different filters (e.g., a series of different colors). As the filter carrier moves relative to the light source, the emissions are modified by the current filter causing the target to receive different emissions from a single light source. Similarly, a filter carrier including opaque sections and translucent sections creates discontinuities (e.g., blinking patterns) in the emissions. Such variable emissions may serve a decorative (e.g., color changing/flashing lighting) or functional purpose (e.g., emission wavelength control). In various embodiments, the optical waveguides include fiber Bragg gratings to filter the wavelengths of the emissions. In some embodiments, the filters are integrated into or attached to the lenses.

In various embodiments, a light source (e.g., laser or LEDs) operating partially or completely outside the output spectrum is used in conjunction with a nonlinear optical medium 47 or an optical fiber frequency shifter (e.g., a polychromatic acousto-optic modulator). Light from the light source interacts with the nonlinear optical medium effectively causing photons to combine and form new photons with greater energy (i.e., with a higher frequency). The nonlinear optical medium allows the frequency of the light source to be altered as necessary (e.g., doubled, tripled, or quadrupled) to obtain output wavelengths in or near the output spectrum. In some embodiments, infrared emissions are converted to ultraviolet emissions to make phosphors luminesce.

The output wavelength may be varied, for example, by changing phase matching conditions, such as temperature or the phase matching angle between the emissions of the light source (e.g., the laser beam) and the optical axes of a nonlinear crystal. In some embodiments, the phase matching angle is adjusted by altering the angle of the emissions (e.g., using optical waveguides) or changing the position/orientation of the laser or the nonlinear crystal using a motor.

An optional cooling subsystem provides for enhanced dissipation of heat generated by the light source 16. In various embodiments, the optional cooling subsystem includes one or more vents 24 allowing heated air to escape the housing and/or cool air to enter the housing. In one example, a substantially porous housing or portion thereof forms the vent(s). In another embodiment, the housing has open ends facilitating air ducting. In some embodiments, the optional cooling subsystem includes a fan 22 to circulate air 19 in the housing. In some embodiments, the fan is deployed to draw cool air into the housing. In other embodiments, the fan is deployed to force hot air out of the housing. In some embodiments, operation of the fan is thermally controlled via a temperature monitoring switch. In some embodiments, a fan is a variable speed fan where the fan speed is adjusted based on temperature via a temperature monitoring switch such as a nickel titanium (nitinol) switch or a thermostat. In yet another embodiment using optical waveguides for distribution of the light, the housing 18 is located within an air conditioning duct to reduce the temperature of the light source 16. In a still further embodiment, the optional cooling subsystem uses fluids other than air (e.g., liquids such as water or mineral oil) to dissipate heat from the artificial lighting system.

The artificial lighting system optionally includes a drive system 31 to move or drive the various components of the artificial lighting system including, but not limited to, light sources, reflectors, filters or filter carriers, lenses or lens carriers, cooling subsystems (e.g., the fan), nonlinear optical media, and output arrays as described herein. In various embodiments, the drive system is based on a motor (e.g., hydraulic or electric). In other embodiments, the drive system is based on the convection of hot air naturally flowing through vents at the top of the housing or air flowing due to the cooling system. The drive system includes an appropriate linkage 32 (e.g., a drive shaft or belt, etc.), transmission, gear train, cam system, or other similar coupling arrangement to impart the desired motion characteristics including, but not limited to the type of motion (e.g., linear, angular, or rotational), speed, and torque on the component being moved. For example, one component may rotate about or orbit another component. Alternatively, one component may slide or pivot relative to a second component. The artificial lighting system may include more than one motor and/or associated coupling arrangement to provide independent control over different components.

The speed or duty cycle of the motor may vary to control the emissions. In some embodiments, a control system 33 in communication with the drive system controls allows more complex control over the movement of various components. The control system may be mechanical (e.g., a gear system), electrical, or a combination thereof. The control system may include digital or analog components. The components may be discrete or integrated (e.g., a controller, application specific integrated circuit, etc.). The control system may include detectors or sensors 35 to provide input or feedback used to monitor and/or adjust the movement of a component. For example, the control system may include timers, switches, sensors, or detectors to limit the movement of a component, to cause a component to change direction (e.g., reverse), to activate movement of a component upon the occurrence of a specified condition (e.g., light level, temperature, time of day, elapsed time, etc.), or measure to the position or distance of component (e.g., the output array) relative to a target (e.g., a plant). In some embodiments, motion is stopped and started as needed rather than being continuous. For example, a filter carrier with four filters may move one quarter rotation once every six hours to provide four different types of filtered light during a 24 hour period.

Movement provides various benefits in the artificial lighting system depending upon the component being moved. For example, movement of the light source, the lens, or the reflector within the housing may allow the emissions to be directed at multiple separate optical distribution subsystems that provide light to different remote locations. Movement of the light source may also be associated with exposing an optical distribution subsystem to a particular lamp in the light source. Movement of the lens or the reflector may also be associated with changing the focus, shape, direction, or intensity of the emissions. Movement of the filter may allow a characteristic of the emissions (e.g., color, intensity) to be varied or sequenced over time based or the emissions to be blocked and unblocked with repeatedly turning the light source off and on, which typically shortens the life span of the light source. Changing the position or angle of the output array or the individual components of the output array may allow the light to be simultaneously distributed over a larger (or smaller) area with less (or greater) intensity or the light footprint to be moved to cover different areas at different times. Adjusting the position of the light source or the nonlinear optical medium may allow the emission wavelength to be varied.

In various embodiments, the artificial lighting system (in different shapes and formats) and other components are incorporated into existing room lighting fixtures to provide a more efficient room lighting system in which light may be directed to where it is useful. For example, the artificial lighting system may include a hemispherical housing 18 directing light from a section of a wall sconce or lamp that is otherwise wasting light illuminating only a wall or ceiling (which may absorb much of the light).

Figure 4:
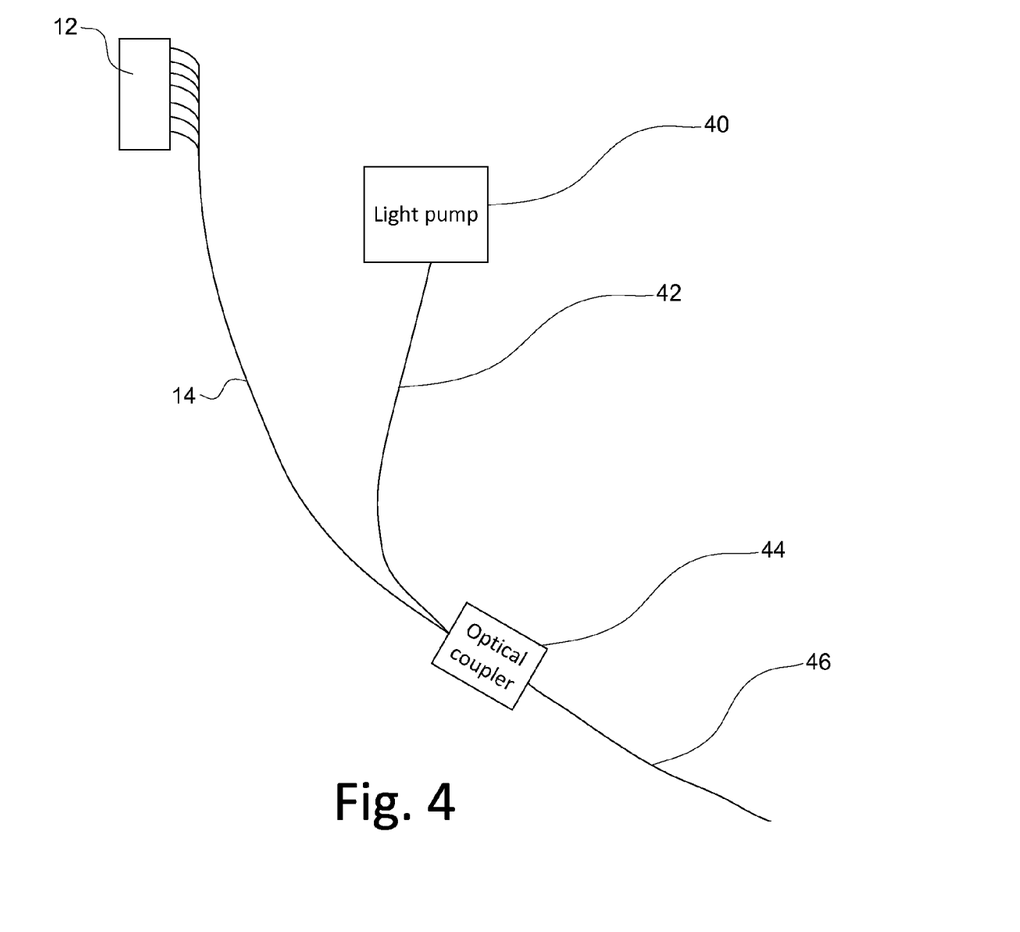
FIG. 4 is a plan view of a fiber optic lighting system according to an alternate embodiment of the present disclosure.

FIG. 4 illustrates one embodiment of the artificial lighting system including an amplifier to increase the energy of the electromagnetic radiation traveling through the waveguide 14. Constructive interference amplification and/or Raman amplification may be used to amplify the emissions from the light source 16 in the optical waveguide 14. Using Raman amplification, the emissions from the light source 16 may be co- or counter-propagated with a beam emitted from the light pump 40, such as a solid-state or diode laser. The beam emitted from the light pump 40 passes through the optical waveguide 42 and is joined with the emissions from light source 16 via the optical coupler 44. Extra photons are produced from the inelastic scattering of the beam from the light pump induced by the lower frequency emissions from the light source. The amplified emissions travels through the optical waveguide 46 and is emitted at the desired location. For example, infrared light has less attenuation and may be further amplified using Raman amplification. Amplification of the emissions from the light source allows the light source 16 to be located further from the desired location for emitting light. Using constructive interference amplification, the emissions are amplified by causing them to propagate together, for example, by merging two optical waveguides into a single optical waveguide.

A wider amplification bandwidth is obtained by using optical parametric amplification in which a nonlinear optical crystal divides a photon from the light pump into two photons (called the signal and idler). The phase matching conditions, such as temperature or the phase matching angle between the pump laser ray and optical axes of the crystal determine the wavelength of the new photons. Tuning of the phase matching conditions allows the wavelength to be changed or varied. Using non-collinear optical parametric amplifiers, the phase fronts of the beam resulting from the photonic crystal point in the same direction as the energy flow, which results in an even larger bandwidth than that obtained with collinear optical parametric amplifiers.

In some embodiments, an optical waveguide doped with a gain medium is used for amplification. Examples of suitable dopants include, but are not limited to, erbium, thulium, praseodymium, ytterbium, and semiconductor materials. A pump laser excites dopant ions in an optical waveguide to a higher energy state. Stimulated emission of photons at the signal wavelength results as the ions decay back to a lower energy state. A nonlinear optical medium effectively combines the photons to form new photons with greater energy, and thus higher frequency (i.e., a changed wavelength), as the emissions pass through the doped optical waveguide. Anti-reflection design elements such as anti-reflective coatings or tilted window regions at the end faces may be used to prevent the amplifier from acting as a laser.

Figures 5A, 5B:
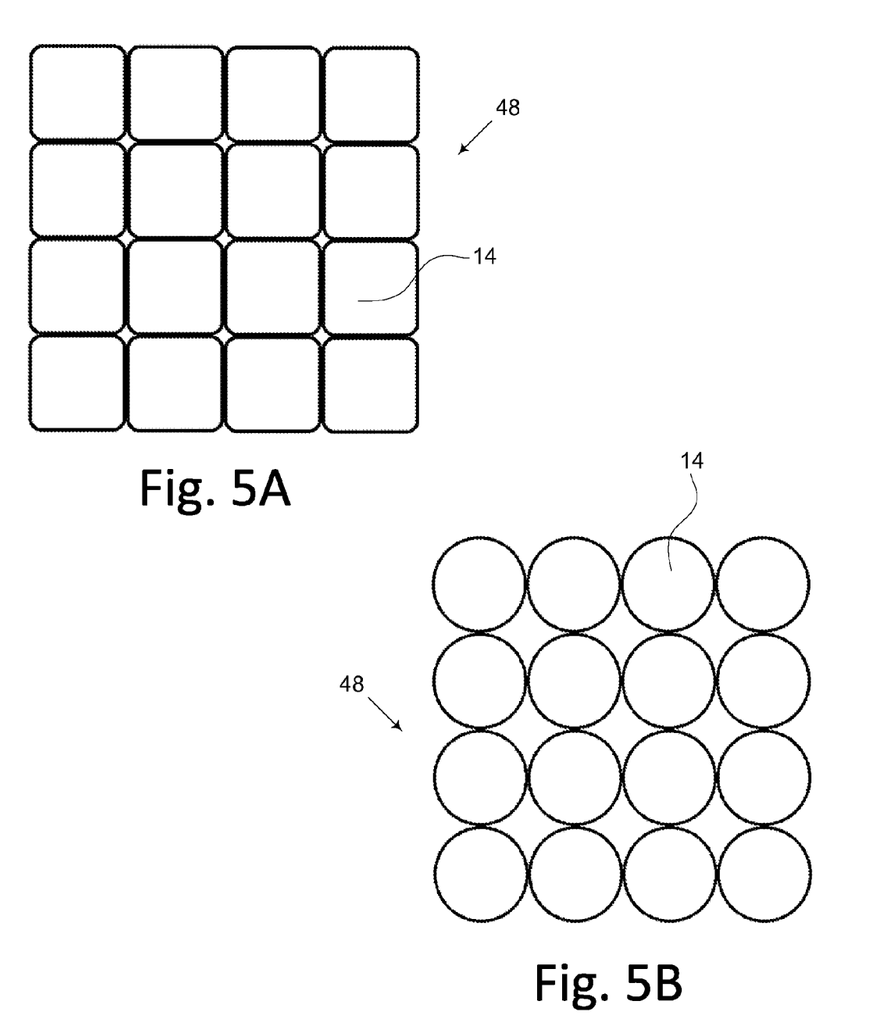
FIGS. 5A, 5B and 6 illustrate various embodiments of optical waveguide arrays with alternate shapes for optical waveguides according to various embodiments of the present disclosure.
Figure 6:
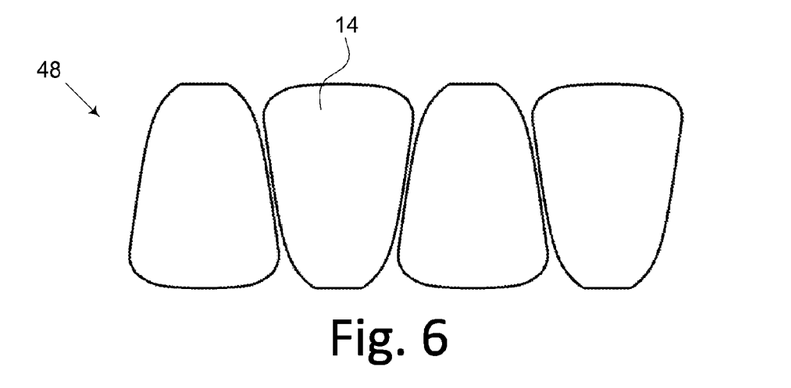

Various embodiments of the artificial lighting system distribute the light via one or more output arrays 48 as illustrated in FIGS. 5A and 5B. In the output array, the second ends of some or all of the optical waveguides 14 are grouped together in an arrangement providing the desired light footprint and concentration. Suitable arrangements for the optical waveguide arrays include, but are not limited to, substantially rectangular, circular, and ring (i.e., bounding) shapes. Typically, the ends of the optical waveguides are held by or attached to output array carrier such as a faceplate 50. FIGS. 5A, 5B, and 6 illustrate the optical waveguides making up the output arrays 48 with substantially square, circular, and trapezoid cross-sections representing some of the various cross-sectional shapes for the optical waveguides.

In some embodiments, the optical waveguide array 48 presents a substantially flat face. In other words, the ends of the optical waveguides lie in substantially the same plane. In some embodiments, the optical waveguides making up the optical waveguide array 48 are all oriented at the same angle to create a uniform light footprint. In other embodiments, the individual optical waveguides making up the optical waveguide array 48 are selectively angled to create a non-uniform light footprint. In some embodiments, the individual optical waveguides making up the optical waveguide array 48 are positioned at different heights. This results in an optical waveguide array with an uneven (i.e., not flat) face and allows the position of the individual optical waveguides to vary with respect to the target area. Individually height adjusted optical waveguides allow light to be directed at a plant from different distances to create varying levels of illuminance. Individually angled optical waveguides allow light to be directed at a plant from different angles so upper foliage does not block all of the light from reaching lower foliage. This would increase brightness and efficiency, and more evenly cover foliage within the light footprint.

In some embodiments, the LEDs are fabricated by encasing the electroluminescent components in a plastic such as acrylic or perfluorinated polymers, polyvinyl chloride (PVC), a pure glass such as silica, ceramics, polyurethanes, a polymer such as translucent silicon or latex, or a combination thereof. Because most LEDs are not usually high intensity devices, the LEDs must be positioned closer to target area. In an alternative embodiment of the artificial lighting system, the optical waveguide array is replaced by an LED array that substitutes individual LEDs for the individual optical waveguides. The LED array is arranged and has the same functionality as the optical waveguide array described above. In yet another embodiment of the artificial lighting system, the optical waveguide array is supplemented with LEDs offering the same functionality (i.e., selective orientation and position) as described above. LEDs may be attached to or suspended from the optical waveguide array 48 with a material that may be contained within the array and may be drawn out to a desirable distance towards the lower foliage of a plant. Alternatively, a length of material may be contained below the array, or it may reach through and above the array, allowing adjustment of the height of the LEDs. The material may maintain its shape to allow the LEDs to be positioned to a desirable configuration around plant foliage. In some embodiments, a cylindrical array of LEDs is used to provide light to the target.

Figure 7:
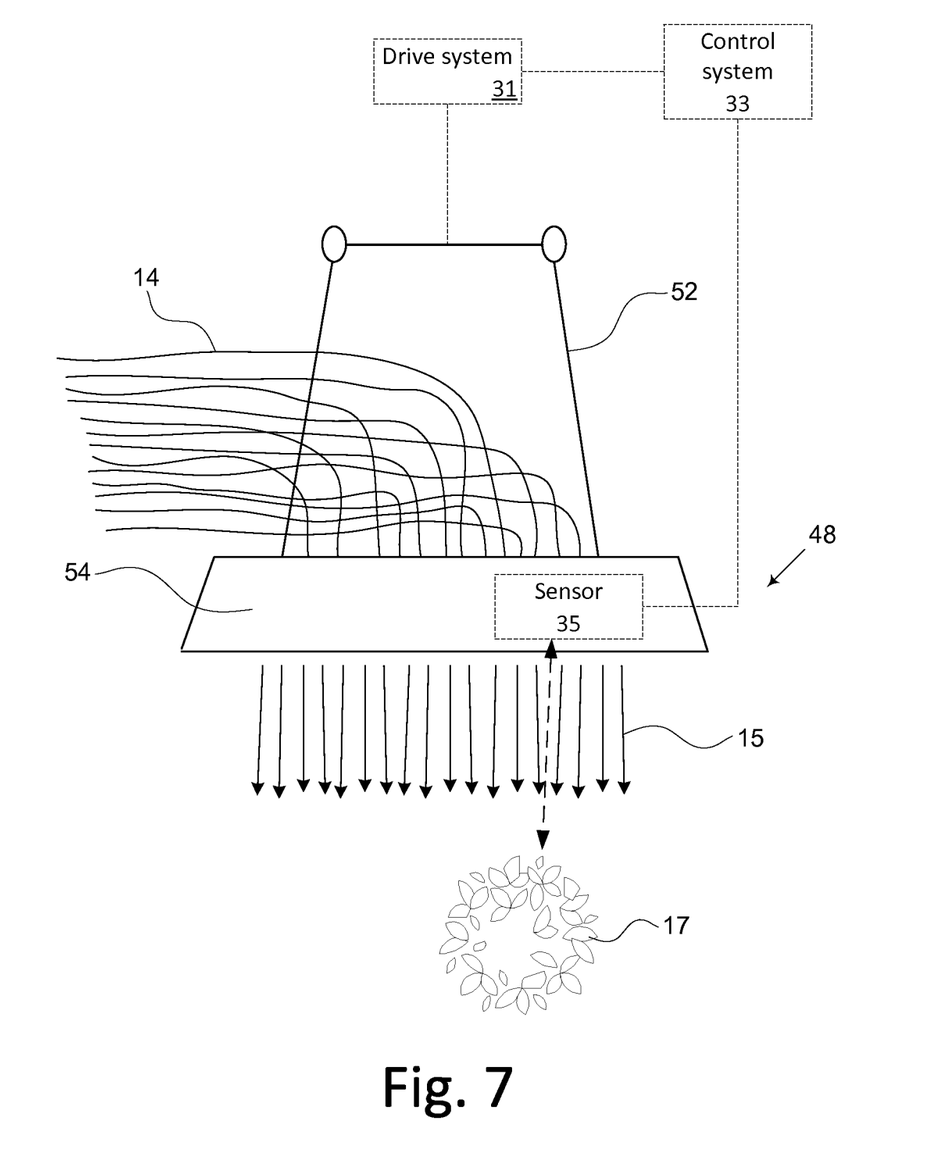
FIG. 7 illustrates a system for suspending illuminated optical waveguides above plant foliage, in an array or directing the individual cables to the leaves.

FIG. 7 illustrates one embodiment of a system for suspending the optical waveguide array 48. The optical waveguide array or the output array carrier may be suspended with one or more cables 52. In some embodiments, a drive system 31 operatively engaged with the optical waveguide array 48 moves the optical waveguide array 48 to provide focused light to a substantially larger area and from different angles than when located in a fixed position. The drive system may automatically move the suspended array of optical waveguides in a lateral or circular pattern to increase the distribution of intense light, and/or raise the array of optical waveguides away from the plants as they grow. Alternatively, the individual optic waveguides 14 may each be configured to move such that each individual optic waveguide 14 covers a substantially greater area and from different angles than when fixed. Alternatively, the individual optic waveguides 14 may be moved laterally or circularly to increase the distribution of intense light to the desired foliage. These embodiments may be particularly advantageous for use for indoor agriculture, allowing light from fewer optical waveguides to be distributed over the entire target area.

In various embodiments, the artificial lighting system includes a distance or proximity (e.g., laser or ultrasonic based) sensor that measures the distance of the output (i.e., optical waveguide or LED) array from the plant (or other target). A controller in communication with the distance/proximity sensor and the drive system moves the output array to maintain an adequate separation distance as the plant grows. In one embodiment, the controller determines the distance from the output array to the tallest portion of the plant. If that distance is less than a minimum separation distance, the controller operates the drive system to moves the output array away from the plant until the minimum separation distance is reached. Alternatively, the process is reversed to move the output array closer to the plant when the output array is more than a maximum separation distance from the plant.

Some embodiments of the artificial lighting system use an arc tube light source that omits the standard protective bulb, which normally absorbs some of the emissions (i.e., reduces illuminance) and causes the arc tube to be positioned farther away from the lens. In various embodiments, the arc tube light source includes a 360° cylinder lens surrounding an HID arc tube without a protective outer bulb. Alternatively, the arc tube light source includes a tubular lens around an HID arc tube with or without a protective outer bulb. Suitable materials for fabricating the lens and/or the arc tube include, but are not limited to, pure glass such as silica, plastics such as acrylic or perfluorinated polymers, polyvinyl chloride (PVC), ceramics, polyurethanes, rubber, polymers such as translucent silicon or latex, or combinations thereof. The dose and/or combination of chemicals sealed under high pressure in the arc tube would determine color spectrum produced. Examples of suitable chemicals for use in the arc tube include, but are not limited to, sodium, mercury, xenon, argon, neon, thorium, iodide, sodium iodide, and scandium gases.

The arc tube light source lens may be coated with a phosphor to alter the spectrum of the emissions (at the cost of some intensity). The shape of the arc tube may vary. In different embodiments, the arc tube may be linear, circular, twist along its linear axis, spiral in a helix, or bend 180°. Nonlinear shapes may be used to produce a more compact arc tube, increase the surface area of the arc tube, and/or increased volume of pressurized gases in the arc tube. These alternative arc tube formats may also be used in a regular bulb without a lens surface. The lens may contain a starting mechanism and/or a vacuum around the arc tube to reduce heat loss. The lens may filter out harmful ultraviolet (UV) rays (with or without an anti-UV dopant) from the light source emissions. Some embodiments of the lens provide increased light intensity to a desirable location(s) through one or more cylindrical, aspheric, or Fresnel lens faces. The arc tube light source may be used as a light source in a standard reflective light hood or without one. Further, high pressure sodium and metal halide arc tubes may be thinner and longer than usual to provide a larger light footprint (i.e., cover a larger target area) at the expense of less illuminance for use with plants requiring less intense light or prior to flowering.

Alternatively, a tubular 360° cylinder lens could contain an electrode at each end, a low pressure gaseous vapor, and a small amount of mercury in the form of a fluorescent light bulb. A mix of phosphorescent or tri-phosphor chemicals in the coating on the glass of the lens and the gases determine the spectrum of light emitted. Phosphors may be selected to target photosynthetically active wavelengths (such as $CaWO_4$:Pb for blue and/or $Mg_5As_2O_{11}$:Mn for red). White light may be produced with $Ca_5(F,Cl)(PO_4)_3$:Sb,Mn coating the glass, for example. Electricity arcing between the electrodes stimulates the mercury atoms, causing them to release ultraviolet photons which in turn stimulate the phosphor, producing photosythetically active or visible light.

Alternatively, a similar tubular lens could be filled with mercury or argon (both of which produce blue light), for example, with no phosphor coating on the glass (as in a neon sign). Thickness and length of the tube may vary greatly while still producing a suitable light source. In different embodiments, the tube may be linear, circular, twist along its linear axis, spiral in a helix (to increase the surface area of the glass and the volume of the enclosed gas), or bend 180°. Alternatively, a curved tube may be constructed that curves around the profile of a plant to reach the bottom foliage. Multiple curved tubes may be attached to a single base, which may allow rotation of the tubes around the plant.

In another embodiment, a flexible, protective skin containing the low pressure gasses and electrodes, allowing adjustment of the shape of the lamp is fabricated from transparent polyurethanes, translucent rubbers such as silicon or latex, transparent ceramics, plastics such as acrylic or perfluorinated polymers, transparent polyvinyl chloride (PVC), or a combination thereof. In some embodiments, sections of regular fluorescent tubing or tubular lenses are attached around sections of the skin to focus emitted light. In various embodiments, the skin is coated with an anti-ultraviolet filter between the sections of tubing. In other embodiments, the skin contains phosphors throughout the length of the lamp with or without sections of tubing. Some embodiments maintain the shape of the lamp by a form fabricated from a material that can be shaped and will retain such shape, such as a metal wire(s) or other flexible, solid material along the length of the lamp. In other embodiments, the protective skin can be shaped and will retain such shape to provide the shape to the lamp.

In another embodiment, light sources (including HIDs or bare arc tubes, fluorescents, and halogen lights, for example) may be produced which may be fused together and integrated with optical waveguides surrounding some portion of the outer protective bulb, which may or may not have a lens profile to focus light into the optical waveguides. This would reduce coupling loss, which is a loss of light that occurs due to imperfections at the optical waveguide connections. Alternatively, LEDs may be constructed encasing the electroluminescent components in a plastic or other material and integrated with a fiber optic cable(s) to reduce coupling loss.

The description and illustration of one or more embodiments provided in this application is not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. An artificial lighting system comprising:
   a housing;
   a drive system;
   a light source carried within said housing, said light source producing emissions;
   at least one lens arranged to focus said emissions from said light source into focused emissions, said at least one lens operatively linked to and moveable via said drive system to direct said focused emissions into selected waveguides from a plurality of waveguides;

each of said plurality of waveguide having an input end and an output end, said input end in optical communication with and proximately located relative to said light source, said output end positioned to direct said focused emissions to an output location distally located relative to said light source;

at least one vent to passively exhaust heated air from said housing.

2. The artificial lighting system of claim 1 wherein said drive system comprises a motor and a coupling arrangement.

3. The artificial lighting system of claim 2 characterized in that said coupling arrangement operatively links said at least one lens to said motor.

4. The artificial lighting system of claim 2 characterized in that said at least one lens comprises a plurality of lenses carried by a lens carrier and said coupling arrangement operatively links said lens carrier operatively to said motor, said plurality of lenses focusing said emissions into a plurality of focused emissions, said lens carrier moveable via said drive system to direct said focused emissions into selected waveguides from said plurality of waveguides.

5. The artificial lighting system of claim 1 characterized in that said at least one lens comprises a single cylindrical lens.

6. The artificial lighting system of claim 1 further comprising a reflector positioned relative to said light source and said at least one lens to reflect emissions from said light source into said lens.

7. The artificial lighting system of claim 1 further comprising a filter positioned between said light source and at least some of said plurality of said waveguides, said filter selected to alter at least one characteristic of said emissions selected from the group of characteristics including illuminance and wavelength.

8. The artificial lighting system of claim 2 characterized in that said plurality of waveguides comprises a first group of waveguides and a second group of waveguides, said second group of waveguides being different from said first group of waveguides, said artificial lighting system further comprising:

a first filter selected to alter at least one characteristic of said emissions, said coupling arrangement operatively linking said first filter to said motor, said first filter moveable by said drive system to a first position between said light source and said first group of waveguides and a second position between said light source and said second group of waveguides.

9. The artificial lighting system of claim 8 further comprising a second filter selected to alter at least one characteristic of said emissions, said second filter altering said emissions differently than said first filter, said coupling arrangement operatively linking said second filter to said motor, said second filter moveable by said drive system to said first position and said second position.

10. The artificial lighting system of claim 1 characterized in that emissions have wavelengths in the infrared spectrum, said artificial lighting system further comprising a nonlinear optical medium reacting with said emissions to alter the frequency of said emissions to have wavelengths in at least one of the visible light spectrum and the photosynthetically active spectrum.

11. The artificial lighting system of claim 1 further comprising an amplifier in optical communication with at least some of said plurality of waveguides, said amplifier amplifying said emissions in said at least some of said plurality of waveguides.

12. The artificial lighting system of claim 1 characterized in that said at least one vent comprises a plurality of openings defined by said housing to allow heated air to escape from said housing.

13. The artificial lighting system of claim 1 further comprising a fan in fluid communication with said at least one vent to actively exhaust heated air from said housing.

14. The artificial lighting system of claim 1 characterized in that said output ends of selected waveguides from said plurality of waveguides are grouped into an output array.

15. The artificial lighting system of claim 2 wherein said coupling arrangement operatively links said output ends of selected waveguides from said plurality of waveguides to said motor, said output ends of said selected waveguides movable between a first position distributing light to a first area and a second position distributing light to a second area.

16. The artificial lighting system of claim 2 wherein said coupling arrangement operatively links said output ends of selected waveguides from said plurality of waveguides to said motor, said output ends of said selected waveguides, said artificial lighting system further comprising:

a distance sensor positioned proximate to said output ends of selected waveguides from said plurality of waveguides, said distance sensor measuring a distance between said output ends and a target receiving light from said output ends; and a controller in communication with said distance sensor and said motor, said controller moving said output ends of said selected waveguides based on said distance via said drive system.

17. The artificial lighting system of claim 1 characterized in that said light source includes one or more lamps selected from the group consisting of mercury vapor lamps, metal halide lamps, sodium vapor lamps, xenon lamps, fluorescent lamps, halogen lamps, light emitting diodes, and lasers.

18. The artificial lighting system of claim 1 characterized in that a substantial portion of said emissions have wavelengths in the range of approximately 380 nm to approximately 770 nm.

19. The artificial lighting system of claim 1 characterized in that a substantial portion of said emissions have wavelengths in the range of approximately 650 nm to approximately 670 nm.

20. The artificial lighting system of claim 1 characterized in that a substantial portion of said emissions have wavelengths in the range of approximately 430 nm to approximately 450 nm.

* * * * *